(12) United States Patent  
Sayavong

(10) Patent No.: US 8,405,974 B2  
(45) Date of Patent: Mar. 26, 2013

(54) DOCKING CRADLE

(75) Inventor: Rajmy Sayavong, Grimsby (CA)

(73) Assignee: Psion Inc., Mississauga, Ontario (CA)

( * ) Notice: Subject to any disclaimer, the term of this patent is extended or adjusted under 35 U.S.C. 154(b) by 232 days.

(21) Appl. No.: 12/777,681

(22) Filed: May 11, 2010

(65) Prior Publication Data

US 2011/0279966 A1  Nov. 17, 2011

(51) Int. Cl.
*H05K 7/16* (2006.01)

(52) U.S. Cl. ......... 361/679.43; 361/679.41; 361/679.58; 710/303

(58) Field of Classification Search ............. 361/679.01, 361/679.02, 679.41, 679.4, 679.43, 679.55–679.58; 455/575.1–575.4; 710/303–305
See application file for complete search history.

(56) References Cited

U.S. PATENT DOCUMENTS

| | | | |
|---|---|---|---|
| 5,825,874 A * | 10/1998 | Humphreys et al. | 379/446 |
| 5,832,082 A * | 11/1998 | Nagai | 379/449 |
| 5,898,775 A * | 4/1999 | Niemo et al. | 379/446 |
| 6,532,152 B1 * | 3/2003 | White et al. | 361/692 |
| 6,785,567 B2 * | 8/2004 | Kato | 455/575.9 |
| 6,934,151 B2 * | 8/2005 | Nakano et al. | 361/679.43 |
| 7,139,168 B2 * | 11/2006 | DeLuga et al. | 361/679.58 |
| 2004/0012922 A1 * | 1/2004 | Kamphuis et al. | 361/686 |
| 2009/0219701 A1 * | 9/2009 | Wu et al. | 361/727 |

* cited by examiner

*Primary Examiner* — Jinhee Lee  
*Assistant Examiner* — Ingrid Wright

(57) ABSTRACT

A docking cradle is configured to seat a mobile computer. The docking cradle comprises a docking interface configured to electrically couple the docking cradle to the mobile computer and a latch for latching the mobile computer within the docking cradle. The latch comprises a pair of latching arms and a locking plate. Each latching arm comprises at least one tooth configured to engage a corresponding recess in the mobile computer, an arm pivot point on a lower portion of the latching arm, and an offset portion below the arm pivot point. Each latching arm is rotationally mounted to opposing sides of the docking cradle at the arm pivot point so as to rotate towards and away from each other. Each latching arm is shaped so that a distance between the offset portions is less than the distance between arm pivot points when the latching arms are upright. The locking plate is sized in accordance with the distance between the offset portions, the locking plate movable between a locked position and an unlocked position.

8 Claims, 4 Drawing Sheets

Section A-A

DOCKING CRADLE

This invention relates generally to a docking cradle for a portable electronic device and specifically to a docking cradle having an improved mechanism for retaining the portable electronic device in place when it is docked.

BACKGROUND

Portable electronic devices such as handheld computing and communication devices have fragile electronic components such as circuit boards, processors, and liquid crystal display screens. While it is preferable to treat electronic devices with care, this is not possible when the electronic devices must be exposed to hostile environments or used in applications where rough treatment is unavoidable. For example, mobile computing devices are used at ports, warehouses, freezers, factories, delivery vans and airports—working all day in environments like these, mobile computing devices can get dropped, bumped, sprayed, chilled and generally abused.

There are a class of "rugged" portable electronic devices that are designed to withstand rough treatment and hostile environments. Some design approaches for a rugged electronic device include using fewer case pieces and reducing seams and seals to reduce penetration of water and dust, integrating antennas into the body of the device, increasing the space between internal components to improve shock and vibration resistance, placing display screens inside a thermoplastic elastomer boot to seal it to the device and to protect it from vibration and shock, and for devices which are operated in extremely cold conditions, including a heating element to minimize condensation. Of course, selecting durable materials also contribute to a more rugged device; the device casing can be made from an combination of ABS and polycarbonate that is resistant to stress cracking, and to surround the device with shock absorbent materials.

While efforts can be made to design and build the portable electronic device to be rugged, such devices can still be susceptible to damage due to shock and vibration. Also, shock or vibration or other motion can cause the portable electronic device that is docked in a docking cradle to become dislodged. This can cause the portable electronic device to become disconnected from the power and communications interface of the docking cradle, and worse, the portable electronic device could shake within the cradle or fall out of cradle and become damaged.

SUMMARY OF THE INVENTION

In accordance with an aspect of the present invention, there is provided a docking cradle configured to seat a mobile computer, the docking cradle comprising a docking interface configured to electrically couple the docking cradle to the mobile computer; and a latch for latching the mobile computer within the docking cradle, the latch comprising: a pair of latching arms, each latching arm comprising: at least one tooth configured to engage a corresponding recess in the mobile computer; an arm pivot point on a lower portion of the latching arm; an offset portion below the pivot point; wherein each latching arm is rotationally mounted to opposing sides of the docking cradle at the arm pivot point so as to rotate towards and away from each other; wherein each latching arm is shaped so that a distance between the offset portions is less than the distance between arm pivot points when the latching arms are upright; and a locking plate sized in accordance with the distance between the offset portions, the locking plate movable between a locked position, in which the locking plate engages the offset portions of the latching arms, and an unlocked position.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
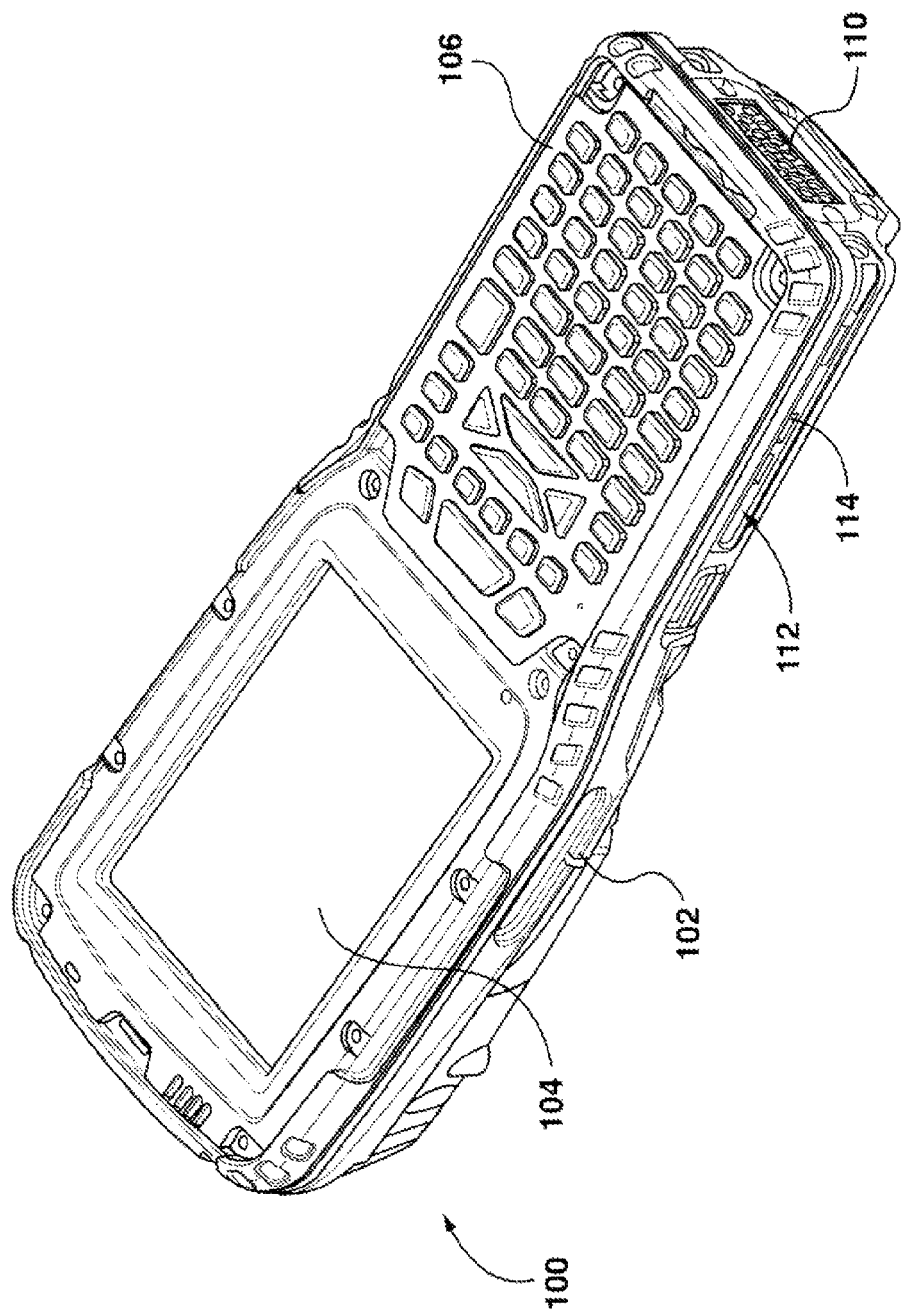
FIG. 1 is perspective view of a mobile computer.

For convenience, like numerals in the description refer to like structures in the drawings. Further, for ease of illustration only, some structures are omitted from some of the drawings. Referring to FIG. 1, a mobile computer (herein referred to variously and interchangeably as a portable electronic device, a handheld device, a handheld computer, or a mobile device) is illustrated generally by numeral 100. The mobile computer 100 comprises a main body 102, a display 104, a keyboard 106, an electrical interface 110 and a pair of side rails 112. In the present embodiment, the electrical interface 110, which is configured to receive power and exchange data, is provided at a bottom of the mobile computer 100. Each of the side rails 112 is located on opposite sides of the mobile computer 100 and comprise at least one recess 114. The side rails 112 are made of a durable material such as metal and are removable from the mobile computer 100 and replaceable by new side rails when worn out.

Figure 2A:
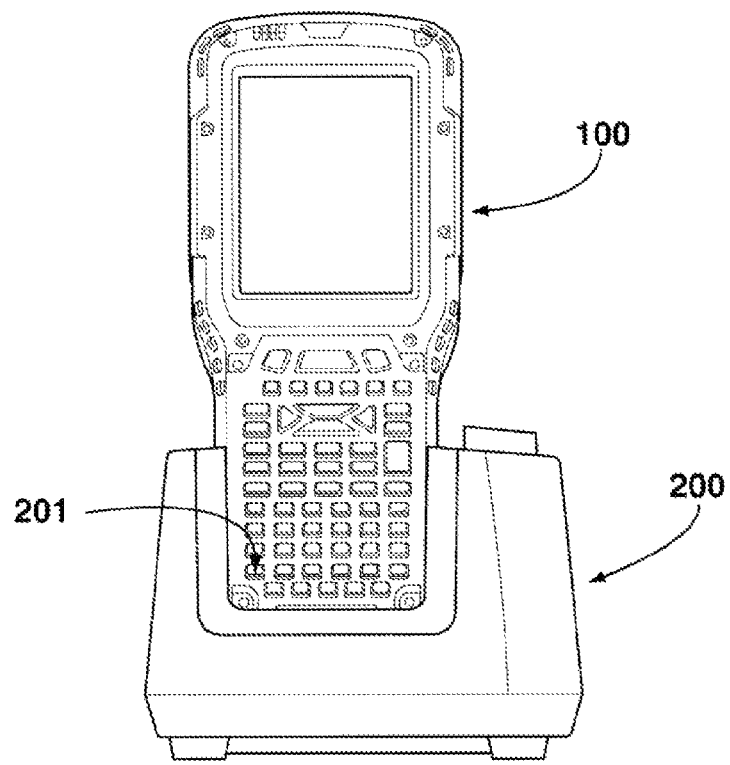
FIG. 2a is front view of the mobile computer seated in a docking station.
Figure 2B:
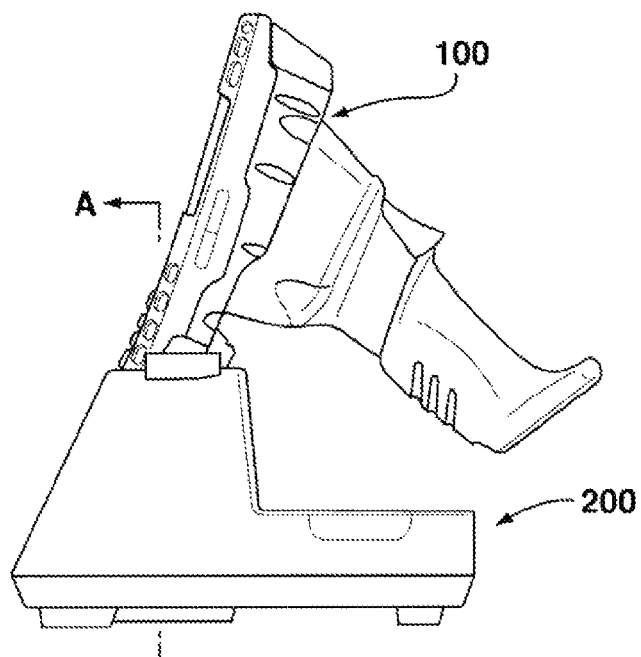
FIG. 2b is a side view of the mobile computer seated in the docking station.

Referring to FIGS. 2a and 2b, a docking cradle in accordance with an embodiment of the preset invention is illustrated generally by numeral 200. The docking cradle 200 includes a cradle recess 201 for receiving the mobile computer 100. The cradle recess 201 is shaped so that at least a portion of the mobile computer 100 fits snugly therein.

Figure 3A:
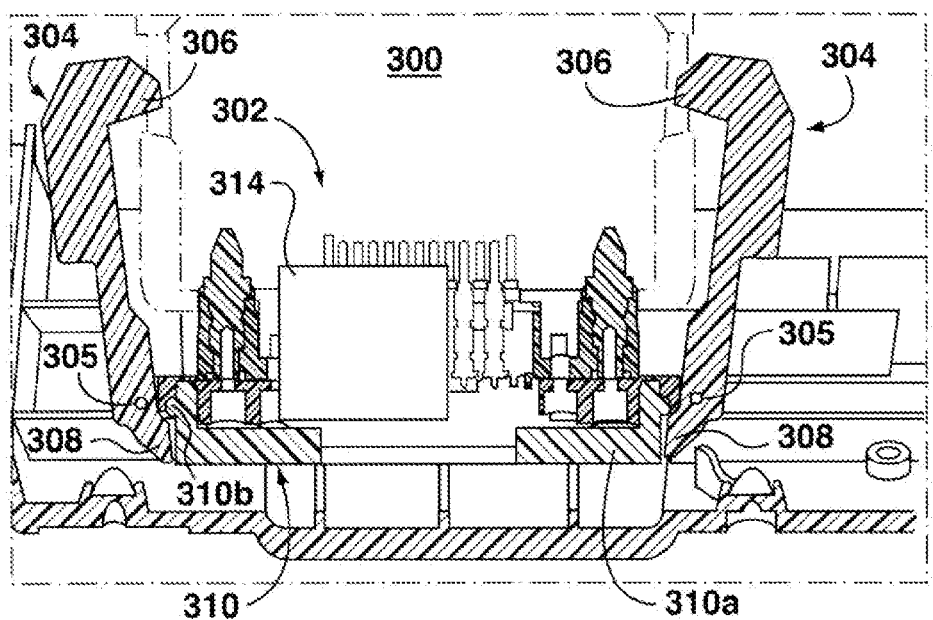
FIG. 3a is a cross-section of the docking station taken along A-A before the mobile computer is seated in the docking station.

Referring to FIG. 3a, a cross-sectional view of the docking cradle along line A-A is illustrated generally by numeral 300. In this view, the docking cradle 200 is shown before the mobile computer 100 is seated and is, therefore, in an unlocked position. A docking interface 302 is providing within the cradle recess 201 and is configured to provide power to and exchange data with the mobile computer 100 via the electrical interface 110. Further, the docking cradle 200 includes a pair of locking arms 304 for locking the mobile computer 100 in the docking cradle 200. Each locking arm 304 is positioned on an opposing side of the docking cradle and includes at least one tooth 306 for engaging a corresponding at least one recess 114 in the side rails 112 of the mobile computer 100.

As illustrated, the docking interface 302 is provided within the cradle recess 201 in a position to mate with the electrical interface 110 of the mobile computer 100. In the present embodiment, the docking interface 302 comprises a plurality of upward facing pogo pins 303. Each locking arm 304 is rotatably attached to the docking cradle 200 about an arm pivot point 305. The arm pivot point 305 located toward a bottom end of the locking arm 304 and is configured to allow each of the locking arms 304 to rotate toward and away from the other of the locking arms 304.

Each locking arm 304 is shaped to include an offset portion 308 proximal the bottom end of the locking arm 304 and below the arm pivot point 305. The offset portion 308 is configured so that when the locking arms 304 are substantially parallel, a distance between the offset portion 308 on each locking arm 304 is less than a distance between the arm pivot points 305 on each locking arm 304.

Figure 4A:
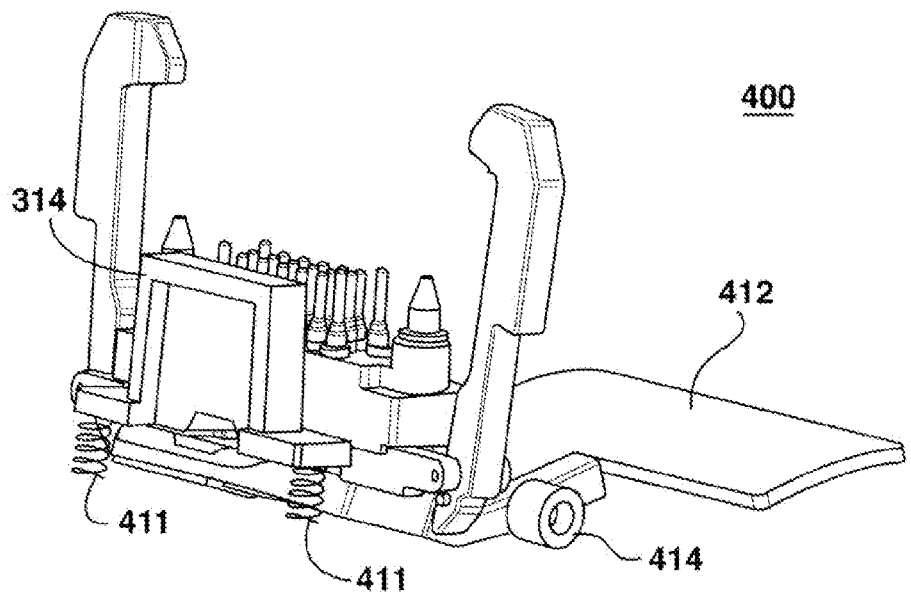
FIG. 4a is a perspective view of the internal components of the docking station before the mobile computer is seated in the docking station.

Referring to FIG. 4a, a perspective view of the internal components of the docking cradle along is illustrated generally by numeral 400. As illustrated in FIGS. 3a and 4a, the docking cradle 200 includes a locking plate 310, an ejection plate 412 and a plunger 314. The width w of the locking plate 310 is configured to be the distance between the offset portions 308 of the locking arms 304 when the teeth 306 are engaged with the recesses 114 of the mobile computer 100. In the embodiment illustrated, the width w of the locking plate 310 comprising a width of main body 310a plus a width of a pair of nubs 310b. Each of the nubs 310b is positioned on an opposite side of the main body 310a. In an alternate embodiment, there may be only one nub 310b, or even no nubs 310b, on the main body 310a.

The locking plate 310 is coupled with the ejection plate 412 so that the locking plate 310 rises when the ejection plate 412 is depressed and vice versa. In the present embodiment, this is achieved by arranging the locking plate 310 and the ejection plate 412 about a plate pivot point 414. Therefore, the locking plate 310 is movable in a generally vertical direction between a locked position and an unlocked position. The plunger 314 is coupled to the locking plate 310 and configured to engage the mobile computer 100, when it is seated in the docking cradle 200. In the present embodiment, the plunger 314 is separate and spaced apart from both the locking plate 310 and the docking interface 302. In an alternate embodiment, the plunger 314 is attached to the locking plate 310.

In FIGS. 3a and 4a, the locking plate 310 is raised in the unlocked position. As illustrated, in the unlocked position the locking plate 310 does not engage the locking arms 304 and the locking arms 304 are free to pivot about the arm pivot point 305. The rotation of the locking arms 304 away from each other is limited by the space between the locking arms 304 and the locking plate 310. The rotation of the locking arms 304 toward each other is limited by the space between the locking arms 304 and a housing of the docking cradle 200. A pair of springs 411 are coupled to the plunger 314 to bias it in the unlocked position. In the present embodiment, the springs 411 are coil springs, however they need not be. Further, in an alternate embodiment, the springs 411 are coupled to the locking plate 310 to bias it in the unlocked position.

Figure 3B:
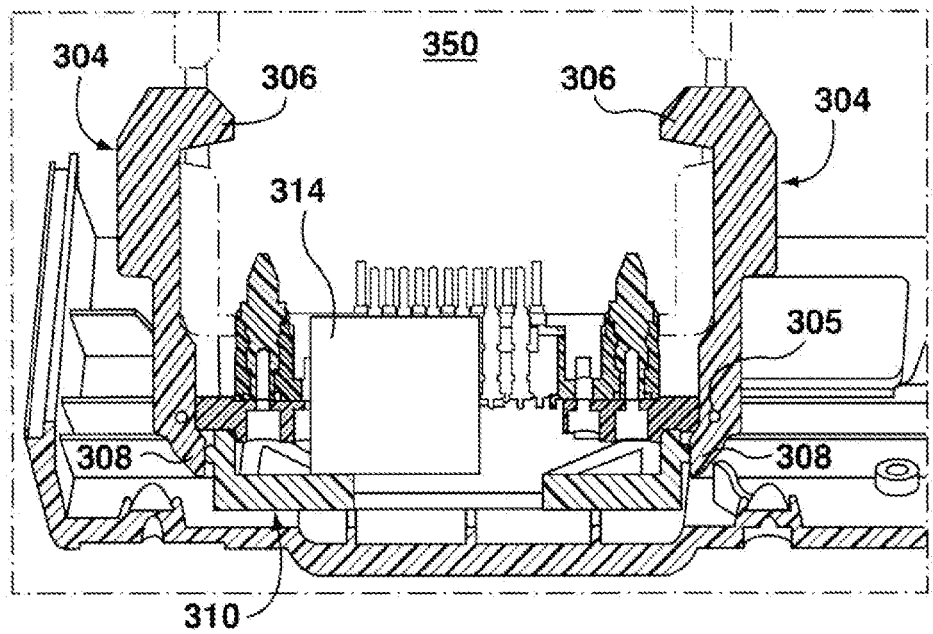
FIG. 3b is a cross-section of the docking station taken along A-A when the mobile computer is seated in the docking station.
Figure 4B:
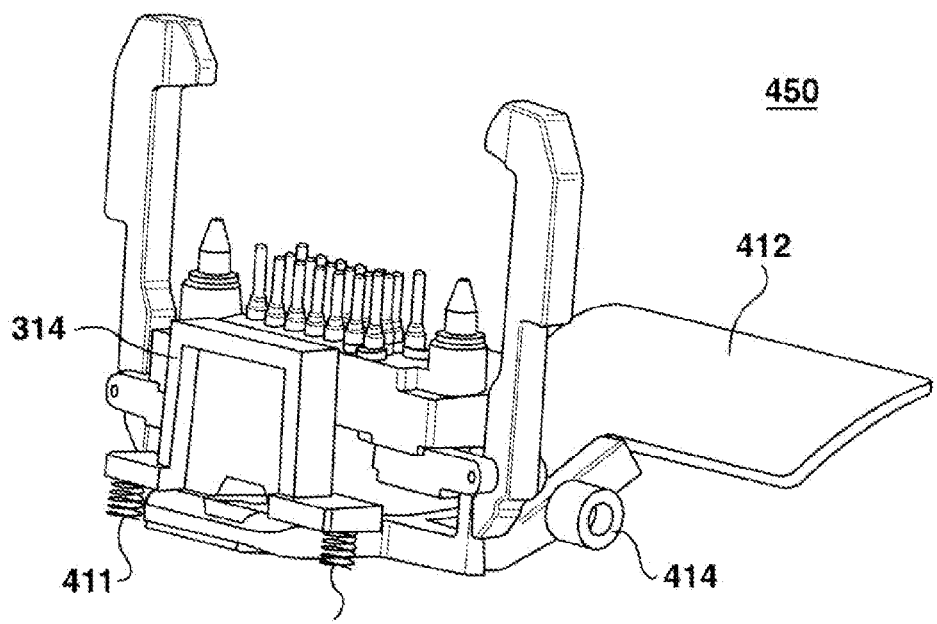
FIG. 4b is a perspective view of the internal components of the docking station when the mobile computer is seated in the docking station.

Referring to FIG. 3b, a cross-sectional view of the docking cradle 200 in a locked position is illustrated generally by numeral 350. Referring to FIG. 4b, a perspective view of the internal components of the docking cradle 200 in a locked position is illustrated generally by numeral 450. The locking plate 310 is lowered in the locked position. As illustrated, in the locked position the locking plate 310 engages the locking arms 304 proximal a bottom portion thereof, causing the engaged portion of the locking arms 304 to move substantially orthogonally to the locking plate's movement and thus rotating locking arms 304 toward each other. The teeth 306 of the locking arms 304 engage the corresponding recesses 114 in the side rails 112 of the mobile computer 100. Accordingly, the locking plate 310 inhibits rotation of the locking arms 304 away from each other. Conversely, the mobile computer 100 inhibits rotation of the locking arms 304 toward each other. Thus, the position of the mobile computer 100 and the locking plate 310 keep the docking station 200 in the locked position.

As will be appreciated, the docking station 200 transitions from the locked state to the unlocked state when the mobile computer 100 is placed therein. That is, the mobile computer 100 engages the plunger 314, which forces the locking plate 310 down. This action results in the locking plate 310 engaging the offset portion 308, thereby causing the locking arms 304 to rotate toward each other. The locking arms 304 rotate until the teeth 306 engage the recesses 114 in the mobile computer 100. At this point, the docking cradle 200 is locked.

Conversely, the docking cradle 200 transitions from the locked state to the unlocked state when the ejection plate 412 is depressed. That is, depressing the ejection plate 412 causes the locking plate 310 to rise, thereby disengaging the locking plate 310 from the offset portion 308 of the locking arms 304. The locking arms 304 can the rotate away from each other, thereby releasing the teeth 306 from the recesses 114 in the mobile computer.

Although the invention has been described with reference to certain specific embodiments, various modifications thereof will be apparent to those skilled in the art without departing from the scope of the invention as defined by the appended claims.

What is claimed is:

1. A docking cradle configured to seat a mobile handheld device, the docking cradle comprising a docking interface configured to electrically couple the docking cradle to the mobile handheld device; and a latch for latching the mobile handheld device within the docking cradle, the latch comprising:
    a pair of latching arms, each latching arm comprising:
        at least one tooth configured to engage a corresponding recess in the mobile handheld device;
        an arm pivot point on a lower portion of the latching arm;
        an offset portion below the arm pivot point;
        wherein each latching arm is rotationally mounted to opposing sides of the docking cradle at the arm pivot point so as to rotate towards and away from each other; and
    a locking plate sized in accordance with the distance between the offset portions, the locking plate movable, in a first direction, between a locked position, in which the locking plate engages the offset portions of the latching arms, and an unlocked position, the engagement causing the offset portions to move in a second direction different that said first direction;
    a plunger attached to the locking plate, the plunger configured to engage the mobile handheld device when it is seated in the docking cradle; and
    an ejection plate configured to actuate the locking plate from the locked position to the unlocked position.

2. The docking cradle of claim 1 further comprising at least one spring configured to bias the latch in the unlocked position.

3. The docking cradle of claim 2, wherein the at least one spring is coupled to the plunger.

4. The docking cradle of claim 2, wherein the at least one spring is coupled to the locking plate.

5. The docking cradle of claim 2, wherein the at least one spring comprises two springs.

6. The docking cradle of claim 2, wherein the at least one spring is a coil spring.

7. The docking cradle of claim 1, wherein the locking plate comprises a main body and a nub at each end of the main body.

8. The docking cradle of claim 1, wherein the ejection plate and the locking plate are coupled about a plate pivot point so that depressing the ejection plate results in the locking plate rising to the unlocked position.

* * * * *